US012283747B2

(12) United States Patent
Chiang

(10) Patent No.: US 12,283,747 B2
(45) Date of Patent: Apr. 22, 2025

(54) DUAL-FREQUENCY ANTENNA STRUCTURE

(71) Applicant: AUDEN TECHNO CORP., Taoyuan (TW)

(72) Inventor: Chi-Ming Chiang, Taoyuan (TW)

(73) Assignee: AUDEN TECHNO CORP, Taoyuan (TW)

( * ) Notice: Subject to any disclaimer, the term of this patent is extended or adjusted under 35 U.S.C. 154(b) by 257 days.

(21) Appl. No.: 18/137,496

(22) Filed: Apr. 21, 2023

(65) Prior Publication Data

US 2024/0356222 A1 Oct. 24, 2024

(51) Int. Cl.
*H01Q 1/50* (2006.01)
*H01Q 5/35* (2015.01)
*H01Q 9/04* (2006.01)

(52) U.S. Cl.
CPC ................. *H01Q 1/50* (2013.01); *H01Q 5/35* (2015.01); *H01Q 9/0435* (2013.01)

(58) Field of Classification Search
CPC ............ H01Q 1/50; H01Q 5/30; H01Q 5/307; H01Q 5/314; H01Q 5/321; H01Q 5/328; H01Q 5/335; H01Q 5/342; H01Q 5/35; H01Q 5/50; H01Q 9/0428; H01Q 9/0435; H01Q 9/0442; H01Q 9/045; H01Q 9/0457
See application file for complete search history.

(56) References Cited

U.S. PATENT DOCUMENTS

2020/0295470 A1* 9/2020 Panther ................ H01Q 9/0457
2022/0102835 A1* 3/2022 Makurin .................. H01Q 1/52

* cited by examiner

*Primary Examiner* — Robert Karacsony
(74) *Attorney, Agent, or Firm* — Li & Cai Intellectual Property (USA) Office

(57) ABSTRACT

A dual-frequency antenna structure includes a substrate, and a grounding element, a conductive sheet, a transmitting antenna, and a receiving antenna that are disposed on the substrate. The transmitting antenna includes a first coupling conductive pad, a first conductive column that is electrically coupled to the first coupling conductive pad and the conductive sheet, and a first feeding conductive pad. The first feeding conductive pad can produce a capacitive effect with each of the first coupling conductive pad and the grounding element. The receiving antenna includes a second coupling conductive pad, a second conductive column that is electrically coupled to the second coupling conductive pad and the conductive sheet, and a second feeding conductive pad. The second feeding conductive pad can produce a capacitive effect with each of the second coupling conductive pad and the grounding element.

9 Claims, 5 Drawing Sheets

DUAL-FREQUENCY ANTENNA STRUCTURE

FIELD OF THE DISCLOSURE

The present disclosure relates to an antenna structure, and more particularly to a dual-frequency antenna structure.

BACKGROUND OF THE DISCLOSURE

In order for a conventional dual-frequency antenna to have a dual-frequency effect, the structure of the conventional dual-frequency antenna is designed to be extremely complicated. In one example, the conventional dual-frequency antenna is provided with copper foil lines that have intricate patterns on each layer of a circuit board. In another example, the conventional dual-frequency antenna is configured with two independently operating antenna architectures. In other words, components of the conventional dual-frequency antenna are complex, and a manufacturing process thereof is not efficient, thereby resulting in high costs.

SUMMARY OF THE DISCLOSURE

In response to the above-referenced technical inadequacy, the present disclosure provides a dual-frequency antenna structure.

In order to solve the above-mentioned problem, one of the technical aspects adopted by the present disclosure is to provide a dual-frequency antenna structure. The dual-frequency antenna structure includes a substrate, a grounding element, a conductive sheet, a transmitting antenna, and a receiving antenna. The substrate includes a first layer and a second layer. The grounding element is disposed on the second layer. The grounding element has a first through hole and a second through hole that are spaced apart from each other. The conductive sheet is disposed on the first layer. The transmitting antenna is disposed on the substrate, and includes a first coupling conductive pad, a first conductive column, and a first feeding conductive pad. The first coupling conductive pad is disposed between the first layer and the second layer. The first coupling conductive pad corresponds in position to the first through hole. The first conductive column is electrically coupled to the first coupling conductive pad and the conductive sheet. The first feeding conductive pad is located in the first through hole. The first feeding conductive pad and the first coupling conductive pad are jointly configured to produce one series capacitive effect, and the first feeding conductive pad and the grounding element are jointly configured to produce one parallel capacitive effect, so as to generate a left-handed circular polarization. The receiving antenna is disposed on the substrate, and the receiving antenna includes a second coupling conductive pad, a second conductive column, and a second feeding conductive pad. The second coupling conductive pad is disposed between the first layer and the second layer. The second coupling conductive pad corresponds in position to the second through hole. The second conductive column is electrically coupled to the second coupling conductive pad and the conductive sheet. The second feeding conductive pad is disposed on the second layer and located in the second through hole. The second feeding conductive pad and the second coupling conductive pad are jointly configured to produce another series capacitive effect, and the second feeding conductive pad and the grounding element are jointly configured to produce another parallel capacitive effect, so as to generate a right-handed circular polarization.

Therefore, in the dual-frequency antenna structure provided by the present disclosure, by virtue of "the first coupling conductive pad and the second coupling conductive pad being disposed between the first layer and the second layer, and corresponding in position respectively to the first through hole and the second through hole" and "the first feeding conductive pad producing a capacitive effect with each of the first coupling conductive pad and the grounding element, and the second feeding conductive pad producing a capacitive effect with each of the second coupling conductive pad and the grounding element," not only can the dual-frequency antenna structure have a dual-frequency effect, but the overall structure can also be simplified at the same time.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
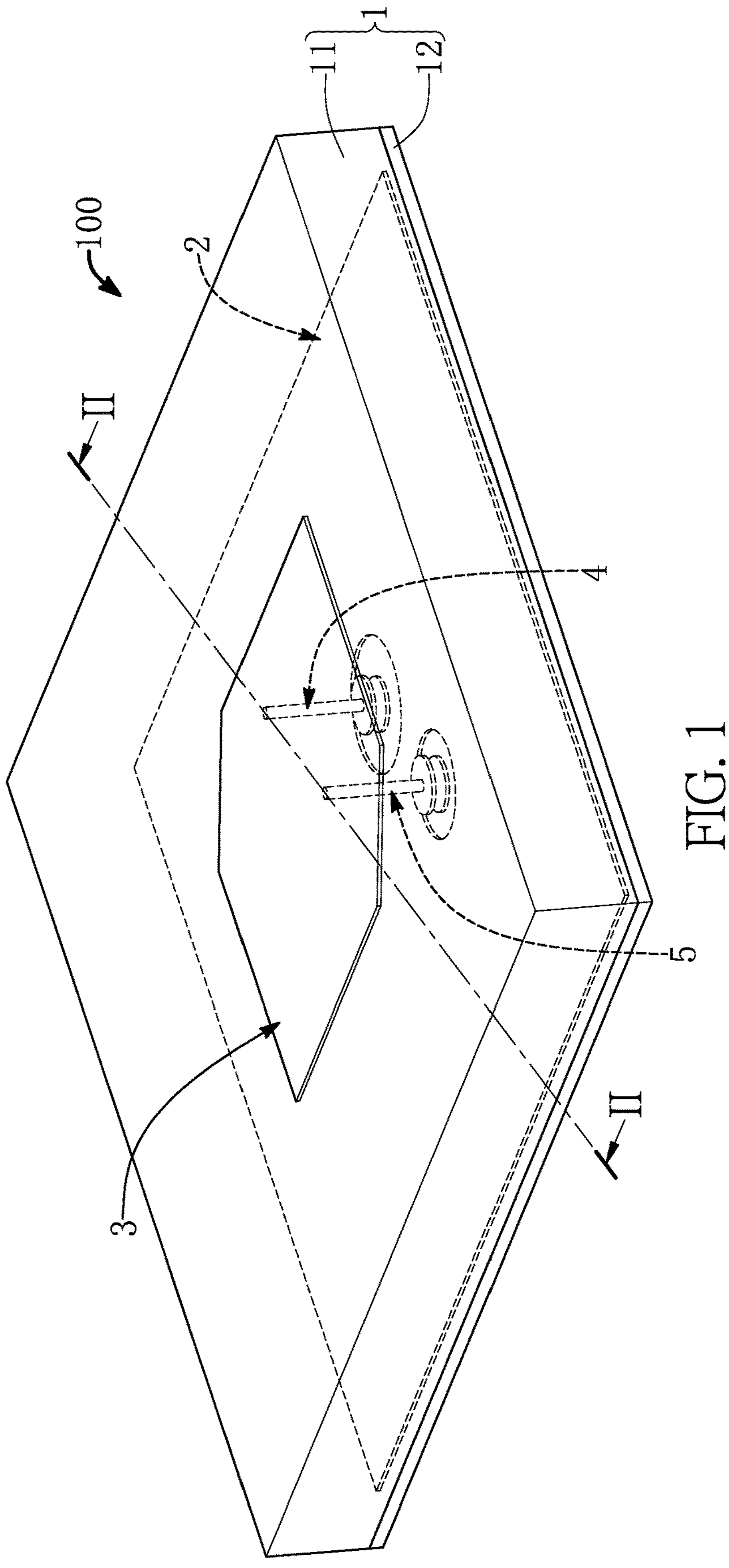
FIG. 1 is a schematic perspective view of a dual-frequency antenna structure according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first,” “second” or “third” can be used to describe various components, signals or the like, which are for distinguishing one component/signal from another one only, and are not intended to, nor should be construed to impose any substantive limitations on the components, signals or the like.

Further, in the following description, if it is indicated that “reference is made to a specific figure” or “as shown in a specific figure”, this is only to emphasize that in the description that follows, most content related thereto is depicted in said specific figure. However, the description that follows should not be construed as being limited to say specific figure only.

Figure 2:
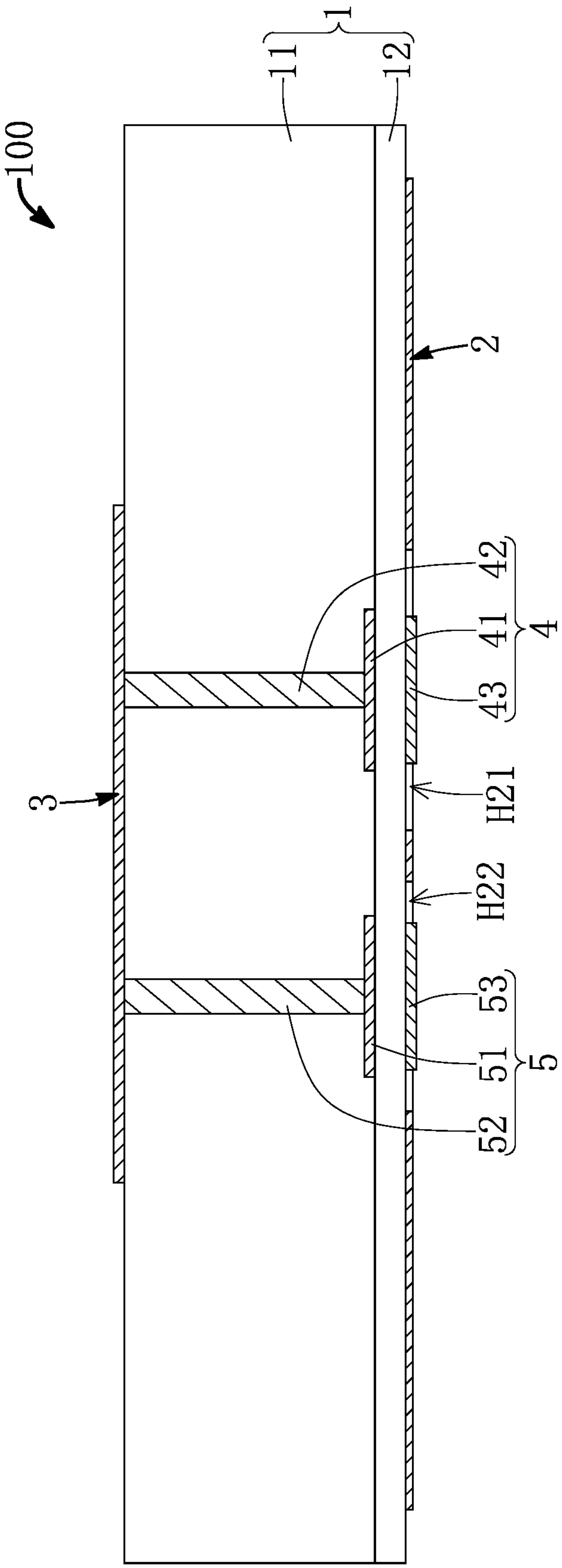
FIG. 2 is a schematic cross-sectional view taken along line II-II of FIG. 1.

Referring to FIG. 1 to FIG. 5, the present disclosure provides a dual-frequency antenna structure 100. As shown in FIG. 1 and FIG. 2, the dual-frequency antenna structure 100 is suitable for a transmission frequency band that has a transmission frequency and a reception frequency. The dual-frequency antenna structure 100 includes a substrate 1, and a grounding element 2, a conductive sheet 3, a transmitting antenna 4, and a receiving antenna 5 that are disposed on the substrate 1. The following description describes the structure and connection relation of each component of the dual-frequency antenna structure 100.

Referring to FIG. 2, the substrate 1 in the present embodiment is a multi-layer structure and has two printed circuit boards. The two printed circuit boards are stacked together, and are respectively defined as a first layer 11 and a second layer 12.

Figure 4:
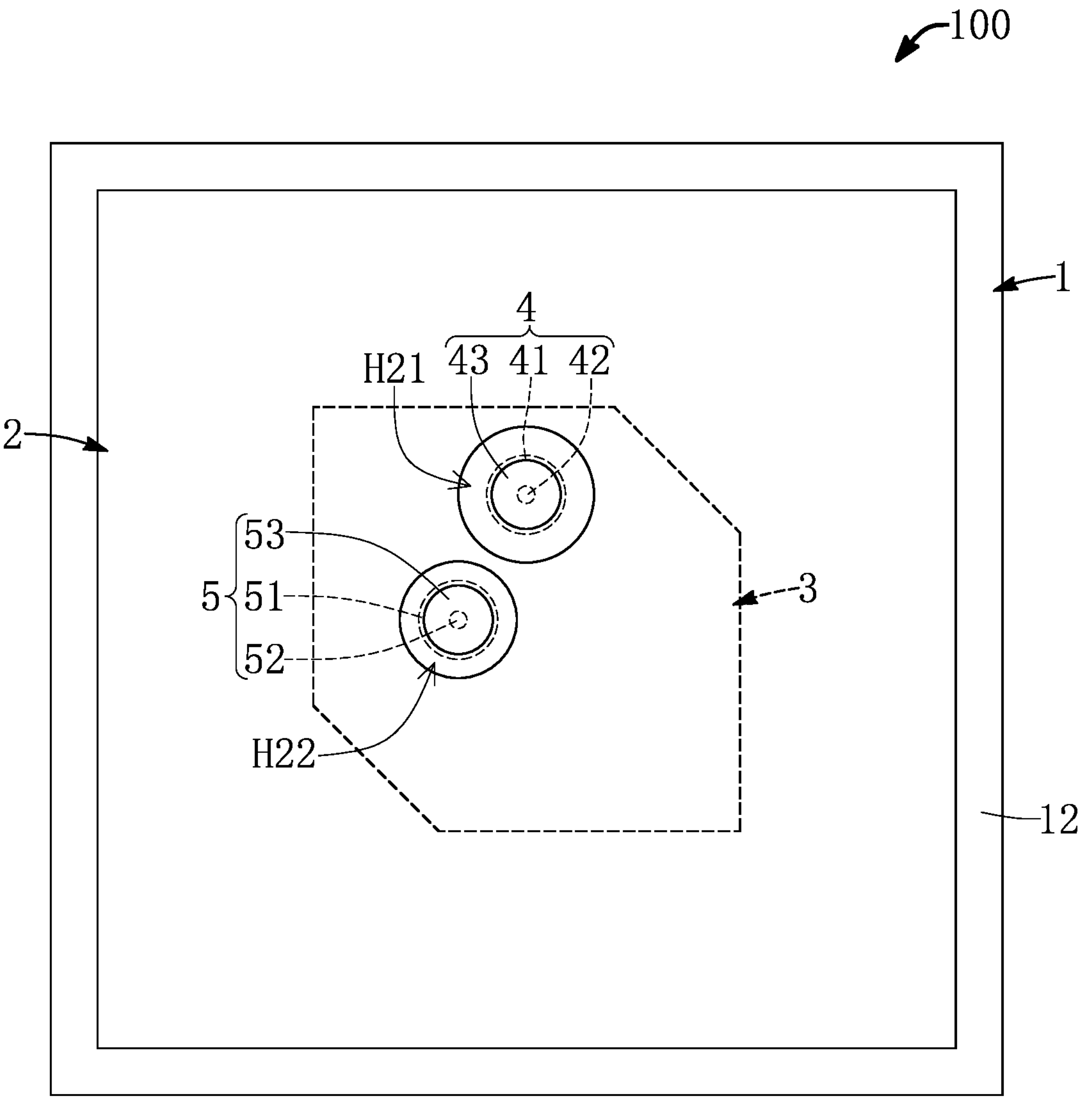
FIG. 4 is a schematic bottom view of the dual-frequency antenna structure according to the present disclosure.

Referring to FIG. 2 and FIG. 4, the grounding element 2 in the present embodiment may be a conductive copper foil, but the present disclosure is not limited thereto. The grounding element 2 is disposed on a side surface of the second layer 12 away from the first layer 11, and the grounding element 2 has a first through hole H21 and a second through hole H22 that are in circular shapes and spaced apart from each other on the second layer 12. In other words, the side surface of the second layer 12 away from the first layer 11 has two configuration areas that are not covered by the grounding element 2.

Figure 3:
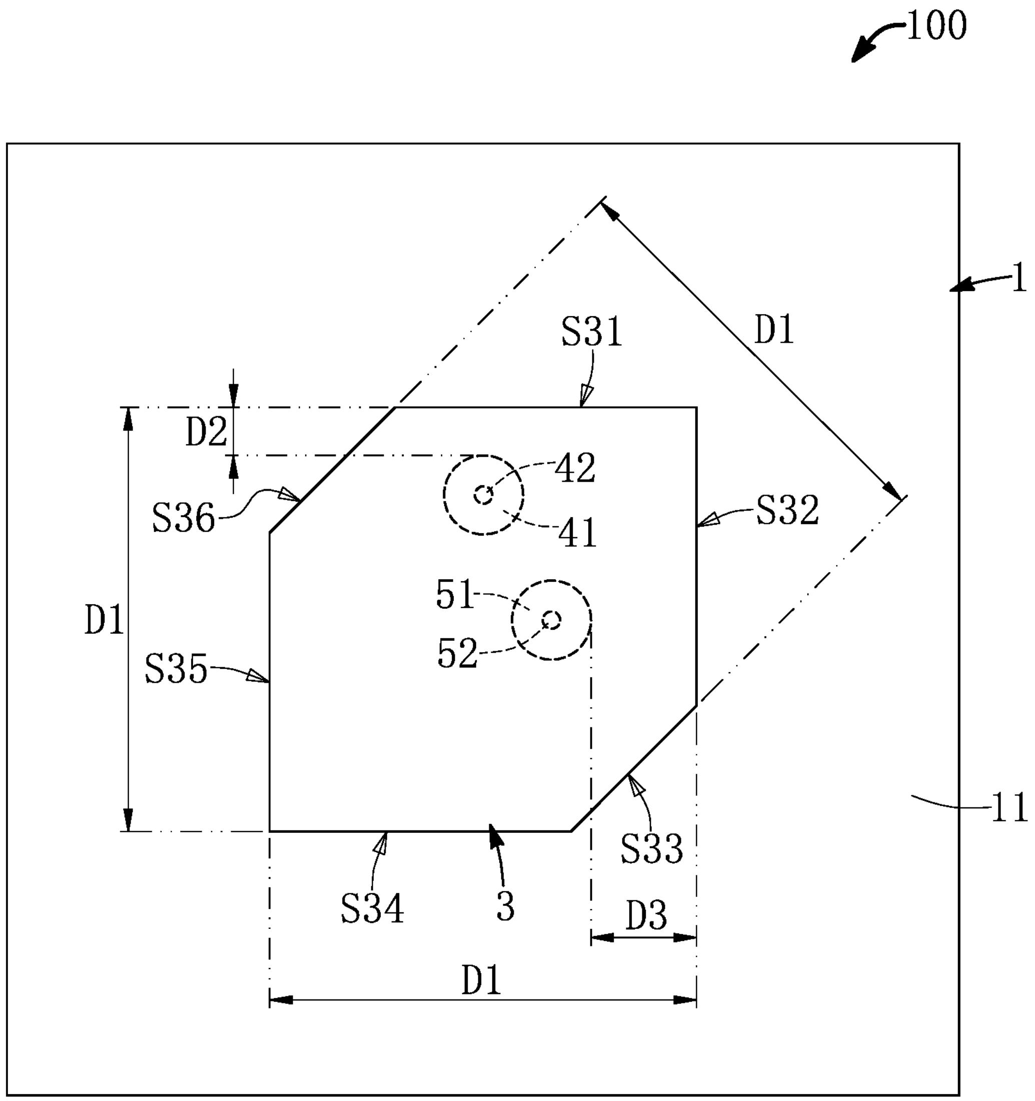
FIG. 3 is a schematic top view of the dual-frequency antenna structure according to the present disclosure.

Referring to FIG. 2 and FIG. 3, the conductive sheet 3 is disposed on a surface side of the first layer 11 away from the second layer 12. The conductive sheet 3 in the present embodiment is a conductive copper foil having a hexagonal structure and has six sides. Any two opposite ones of the six sides are parallel to each other and have a first shortest distance D1 that is within a range from 0.45 to 0.55 times the wavelength corresponding to the center frequency of the transmission frequency band.

For example, the conductive sheet 3 has a first side S31, a second side S32, a third side S33, a fourth side S34, a fifth side S35, and a sixth side S36 in a clockwise direction. The first side S31 is opposite and parallel to the fourth side S34, the second side S32 is opposite and parallel to the fifth side S35, and the third side S33 is opposite and parallel to the sixth side S36. When the wavelength corresponding to the center frequency of the transmission frequency band is 12 millimeters (mm), a shortest distance between the first side S31 and the fourth side S34, a shortest distance between the second side S32 and the fifth side S35, and a shortest distance between the third side S33 and the sixth side S36 can be within a range from 5.4 millimeters (mm) to 6.6 millimeters (mm).

Referring to FIG. 2 and FIG. 4, the transmitting antenna 4 has the transmitting frequency, and the transmitting antenna 4 includes a first coupling conductive pad 41, a first conductive column 42, and a first feeding conductive pad 43. The first coupling conductive pad 41 in the present embodiment may be a conductive copper foil that is in a circular shape, but the present disclosure is not limited thereto. The first coupling conductive pad 41 is disposed between the first layer 11 and the second layer 12, so that the first coupling conductive pad 41 is clamped by the two printed circuit boards, and the first coupling conductive pad 41 corresponds in position to the first through hole H21. That is to say, a region defined by orthogonally projecting the first coupling conductive pad 41 onto the second layer 12 is located in the first through hole H21.

The first conductive column 42 in the present embodiment can be, for example, a plating through hole or a blind via hole, but the present disclosure is not limited thereto. The first conductive column 42 is electrically coupled to the first coupling conductive pad 41 and the conductive sheet 3.

Referring to FIG. 2 and FIG. 4, the first feeding conductive pad 43 is disposed on the side surface of the second layer 12 away from the first layer 11 and located in the first through hole H21, and the first feeding conductive pad 43 and the first coupling conductive pad 41 can produce a series capacitive effect so as to generate a left-handed circular polarization. In addition, the first feeding conductive pad 43 can also produce a parallel capacitive effect with the grounding element 2.

In the present embodiment, the first feeding conductive pad 43 is a conductive copper foil that is in a circular shape, and a position defined by orthogonally projecting the first feeding conductive pad 43 toward the conductive sheet 3 is adjacent to one of the six sides (i.e., the first side S31). The first feeding conductive pad 43 and the first through hole H21 share a common center. In addition, the center of the first feeding conductive pad 43 is preferably overlapped with a center defined by orthogonally projecting the first coupling conductive pad 41 toward the second layer 12, and an area of the first feeding conductive pad 43 is substantially equal to an area of the first coupling conductive pad 41. In other words, the first feeding conductive pad 43, the first through hole H21, and the first coupling conductive pad 41 have a linkage relationship in terms of size.

Naturally, the linkage relationship allows for slight variations (i.e., permissible tolerances). For example, in another embodiment of the present disclosure (not shown), the area of the first feeding conductive pad 43 may also be slightly greater or less than the area of the first coupling conductive pad 41.

Referring to FIG. 2 and FIG. 4, the receiving antenna 5 has the receiving frequency, and the receiving antenna 5 includes a second coupling conductive pad 51, a second conductive column 52, and a second feeding conductive pad 53. The second coupling conductive pad 51 in the present embodiment may be a conductive copper foil that is in a circular shape, but the present disclosure is not limited thereto. The second coupling conductive pad 51 is disposed between the first layer 11 and the second layer 12, so that the second coupling conductive pad 51 is clamped by the two printed circuit boards, and the second coupling conductive pad 51 corresponds in position to the second through hole H22. That is to say, a region defined by orthogonally projecting the second coupling conductive pad 51 toward the second layer 12 is located in the second through hole H22.

The second conductive column 52 in the present embodiment can be, for example, a plating through hole or a blind via hole, but the present disclosure is not limited thereto. The second conductive column 52 is electrically coupled to the second coupling conductive pad 51 and the conductive sheet 3.

Referring to FIG. 2 and FIG. 4, the second feeding conductive pad 53 is disposed on the side surface of the second layer 12 away from the first layer 11 and located in the second through hole H22, and the second feeding conductive pad 53 and the second coupling conductive pad 51 can produce a series capacitive effect so as to generate a right-handed circular polarization. In addition, the second feeding conductive pad 53 can also produce a parallel capacitive effect with the grounding element 2.

In the present embodiment, the second feeding conductive pad 53 is a conductive copper foil that is in a circular shape, and a position defined by orthogonally projecting the second feeding conductive pad 53 toward the conductive sheet 3 is adjacent to one of the six sides (i.e., the second side S32). The second feeding conductive pad 53 and the second through hole H22 share a common center. In addition, the center of the second feeding conductive pad 53 is preferably overlapped with a center defined by orthogonally projecting the second coupling conductive pad 51 toward the second layer 12, and an area of the second feeding conductive pad 53 is substantially equal to an area of the second coupling conductive pad 51. In other words, the second feeding conductive pad 53, the second through hole H22, and the second coupling conductive pad 51 have a linkage relationship in terms of size.

Naturally, the linkage relationship allows for slight variations (i.e., permissible tolerances). For example, in another embodiment of the present disclosure (not shown), the area of the second feeding conductive pad 53 may also be slightly greater or less than the area of the second coupling conductive pad 51.

It is worth mentioning that, in order to ensure that the series capacitive effect of the first feeding conductive pad 43 and that of the second feeding conductive pad 53 are not disturbed, an area of a region defined by orthogonally projecting the first coupling conductive pad 41 toward the second layer 12 is less than or equal to an area of the first through hole H21, and an area of a region defined by orthogonally projecting the second coupling conductive pad 51 toward the second layer 12 is less than or equal to an area of the second through hole H22.

Therefore, a second shortest distance D2 between a position defined by orthogonally projecting the first coupling conductive pad 41 (or the first feeding conductive pad 43) toward the conductive sheet 3 and the first side S31 can be not equal to a third shortest distance D3 between a position defined by orthogonally projecting the second coupling conductive pad 51 (or the second feeding conductive pad 43) toward the conductive sheet 3 and the second side S32, and the second shortest distance D2 is less than the third shortest distance D3, so that the transmission frequency and the reception frequency can have different ranges.

Figure 5:
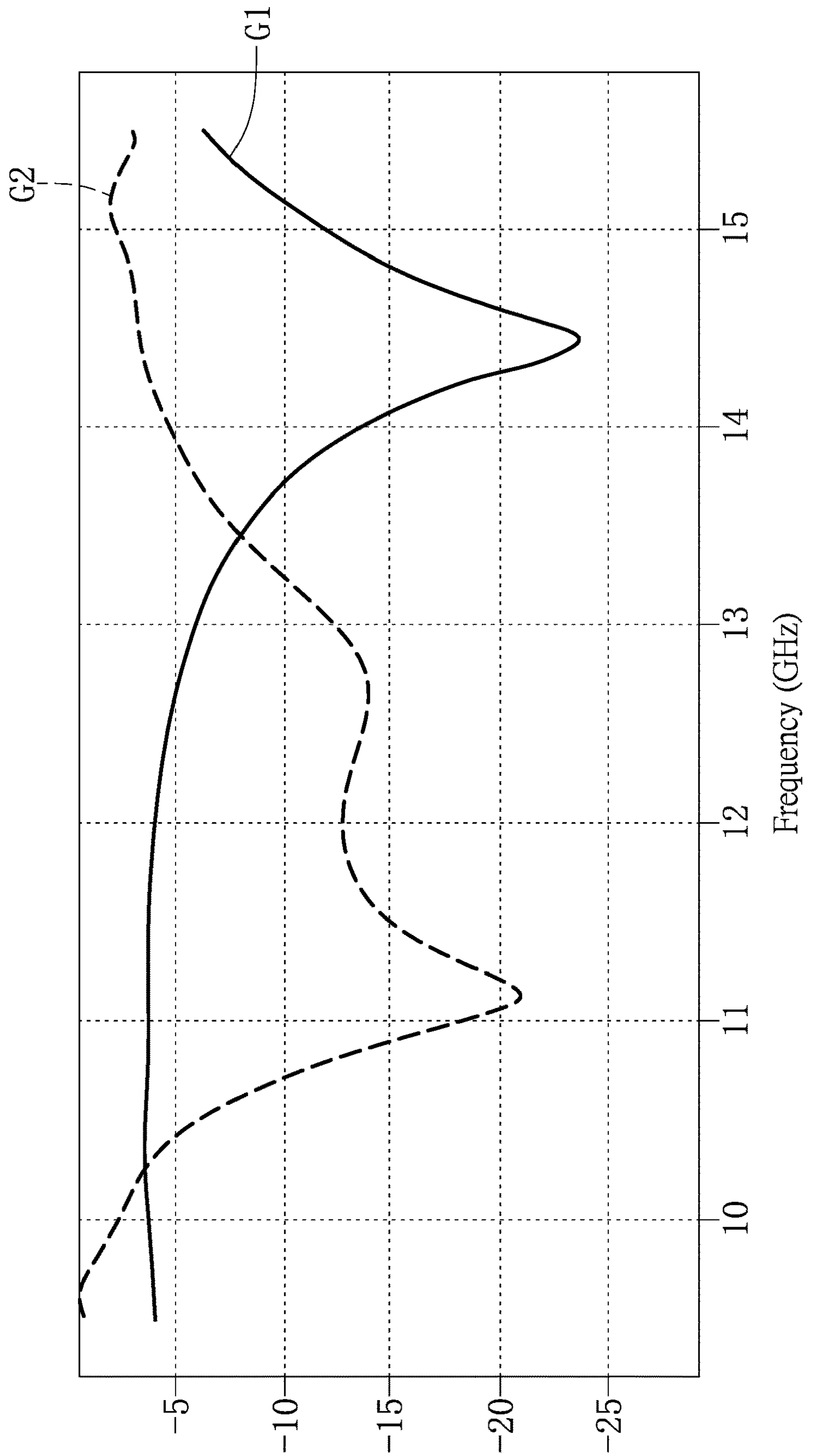
FIG. 5 is a diagram showing return loss data measured by the dual-frequency antenna structure according to the present disclosure.

In particular, FIG. 5 is a diagram showing return loss data measured by the dual-frequency antenna structure 100 according to the present disclosure, and the diagram has a transmission data line G1 and a reception data line G2. It can be clearly seen from the diagram that the transmission data line G1 has lower power within a range from 14 GHz to 15 GHz, and the reception data line G2 has lower power within a range from 10 GHz to 12.7 GHZ. That is to say, the transmission frequency of the dual-frequency antenna structure 100 of the present disclosure is preferably limited within the range from 14 GHz to 15 GHz, and the reception frequency is preferably limited within a range from 10.7 GHz to 12.7 GHZ.

Beneficial Effects of the Embodiment

In conclusion, in the dual-frequency antenna structure provided by the present disclosure, by virtue of "the first coupling conductive pad and the second coupling conductive pad being disposed between the first layer and the second layer, and corresponding in position respectively to the first through hole and the second through hole" and "the first feeding conductive pad producing a capacitive effect with each of the first coupling conductive pad and the grounding element, and the second feeding conductive pad producing a capacitive effect with each of the second coupling conductive pad and the grounding element," not only can the dual-frequency antenna structure have a dual-frequency effect, but the overall structure can also be simplified at the same time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A dual-frequency antenna structure, comprising:

a substrate including a first layer and a second layer;

a grounding element disposed on the second layer, wherein the grounding element has a first through hole and a second through hole that are spaced apart from each other;

a conductive sheet disposed on the first layer;

a transmitting antenna disposed on the substrate, the transmitting antenna including:

a first coupling conductive pad disposed between the first layer and the second layer, wherein the first coupling conductive pad corresponds in position to the first through hole;

a first conductive column electrically coupled to the first coupling conductive pad and the conductive sheet; and a first feeding conductive pad located in the first through hole, wherein the first feeding conductive pad and the first coupling conductive pad are jointly configured to produce one series capacitive effect, and the first feeding conductive pad and the grounding element are jointly configured to produce one parallel capacitive effect, so as to generate a left-handed circular polarization; and a receiving antenna disposed on the substrate, the receiving antenna including:

a second coupling conductive pad disposed between the first layer and the second layer, wherein the second coupling conductive pad corresponds in position to the second through hole;

a second conductive column electrically coupled to the second coupling conductive pad and the conductive sheet; and a second feeding conductive pad disposed on the second layer and located in the second through hole, wherein the second feeding conductive pad and the second coupling conductive pad are jointly configured to produce another series capacitive effect, and the second feeding conductive pad and the grounding element are jointly configured to produce another parallel capacitive effect, so as to generate a right-handed circular polarization.

2. The dual-frequency antenna structure according to claim 1, wherein the dual-frequency antenna structure is configured to be operated in a transmission frequency band, and the conductive sheet is a hexagonal structure having six sides; wherein any two opposite ones of the six sides are parallel to each other and have a first shortest distance there-between, and the first shortest distance is within a range from 0.45 to 0.55 times a wavelength corresponding to a center frequency of the transmission frequency band.

3. The dual-frequency antenna structure according to claim 2, wherein a position defined by orthogonally projecting the first feeding conductive pad onto the conductive sheet is adjacent to one of the six sides, and a second shortest distance is defined there-between; wherein a position defined by orthogonally projecting the second feeding conductive pad onto the conductive sheet is adjacent to one of the six sides, and a third shortest distance is defined there-between; wherein the second shortest distance is not equal to the third shortest distance.

4. The dual-frequency antenna structure according to claim 3, wherein the second shortest distance is less than the third shortest distance.

5. The dual-frequency antenna structure according to claim 1, wherein an area of a region defined by orthogonally projecting the first coupling conductive pad onto the second layer is less than or equal to an area of the first through hole, and an area of a region defined by orthogonally projecting the second coupling conductive pad onto the second layer is less than or equal to an area of the second through hole.

6. The dual-frequency antenna structure according to claim 1, wherein the transmitting antenna has a transmitting frequency within a range from 14 GHz to 15 GHZ, and the receiving antenna has a receiving frequency within a range from 10.7 GHz to 12.7 GHZ.

7. The dual-frequency antenna structure according to claim 1, wherein the first feeding conductive pad and the first through hole share a common center, and the second feeding conductive pad and the second through hole share a common center.

8. The dual-frequency antenna structure according to claim 7, wherein the center of the first feeding conductive pad is overlapped with a center defined by orthogonally projecting the first coupling conductive pad onto the second layer, and the center of the second feeding conductive pad is overlapped with a center defined by orthogonally projecting the second coupling conductive pad onto the second layer.

9. The dual-frequency antenna structure according to claim 8, wherein an area of the first feeding conductive pad is substantially equal to an area of the first coupling conductive pad, and an area of the second feeding conductive pad is substantially equal to an area of the second coupling conductive pad.

* * * * *